United States Patent [19]

Cherry et al.

[11] Patent Number: 5,220,783
[45] Date of Patent: Jun. 22, 1993

[54] FOAMED IN PLACE IGNITER AND AFT-END ASSEMBLY FOR ROCKET MOTOR COMPRISING THE SAME

[75] Inventors: Charles C. Cherry, McGregor; Raymond E. Wiechering, Waco, both of Tex.

[73] Assignee: Hercules Incorporated, Wilmington, Del.

[21] Appl. No.: 762,806

[22] Filed: Sep. 20, 1991

Related U.S. Application Data

[63] Continuation of Ser. No. 559,764, Jul. 30, 1990, abandoned.

[51] Int. Cl.⁵ .................................................. F02K 9/00
[52] U.S. Cl. .................................... 60/204; 60/255; 102/380
[58] Field of Search ................ 60/253, 255, 256, 204; 102/374, 379, 380, 381

[56] References Cited

U.S. PATENT DOCUMENTS

| | | |
|---|---|---|
| 3,166,979 | 1/1965 | Draim . |
| 3,248,873 | 5/1966 | Pase . |
| 3,251,267 | 5/1966 | Hauser et al. ................ 102/380 |
| 3,304,865 | 2/1967 | Gungle . |
| 3,461,672 | 8/1969 | Harris et al. ................ 102/380 |
| 3,911,822 | 10/1975 | Boling ............................ 60/256 |
| 3,946,557 | 3/1976 | Macbeth ......................... 60/253 |
| 3,974,772 | 8/1976 | Pelham et al. ................ 60/256 |
| 4,023,497 | 5/1977 | Morris et al. ................ 60/256 |
| 4,391,196 | 7/1983 | Betts . |
| 4,498,292 | 2/1985 | White . |
| 4,503,773 | 3/1985 | Bolieau .......................... 60/256 |
| 4,573,316 | 3/1986 | Carrier et al. ................ 60/256 |
| 5,022,306 | 6/1991 | Sayles .......................... 60/256 |

Primary Examiner—Richard A. Bertsch
Assistant Examiner—Michael I. Kocharov
Attorney, Agent, or Firm—Mark D. Kuller; Mark Goldberg

[57] ABSTRACT

A process of forming an igniter in an aft-end assembly for a solid rocket motor, the assembly having an internal cavity and comprising at least one element selected from the group consisting of a nozzle, a blast tube and an exit cone, which process comprises positioning an ignition package comprising pyrotechnic material and an initiator in the assembly cavity and causing a polymer foam to expand and cure in the assembly cavity and around the ignition package, so as to embed and secure the ignition package, form an aft closure, and for the igniter as an integral portion of the assembly. In addition, an aft-end assembly for a solid rocket motor is disclosed, which comprises at least one element selected from the group consisting of a nozzle, a blast tube and an exit cone, the assembly having disposed therein polymer foam surrounding an ignition package comprising pyrotechnic material and an initiator so as to embed and secure the ignition package, provide an aft closure, and form an integral portion of the assembly. The foam is capable of filling an assembly having an internal cavity shaped such that a preformed, form-fitting foam igniter cannot be pushed into the assembly.

10 Claims, 1 Drawing Sheet

FOAMED IN PLACE IGNITER AND AFT-END ASSEMBLY FOR ROCKET MOTOR COMPRISING THE SAME

This application is a continuation of application Ser. No. 07/559,764, filed Jul. 30, 1990, now abandoned.

Solid rocket motors generally comprise a cylindrical casing having a propellant charge with a burning cavity, commonly called a propellant grain, cast therein. The aft-end is provided with an assembly (generally comprised of a nozzle, blast tube and exit cone) through which hot gases, evolved by combustion of the propellant charge, pass to produce the motive impulse that drives the rocket. The rocket motor also includes an igniter designed and positioned to throw a flame into the burning cavity of the propellant grain to ignite it.

Conventional rocket motor ignition systems comprise pyrotechnic material, an electro-explosive initiator or squib, and an expandable safe/arm device. The igniter may be either in the anterior portion of the combustion chamber or in or about the aft-end assembly.

A number of designs of aft-end igniters have been proposed. For instance, Morris et al, in U.S. Pat. No. 4,023,497, and Carrier et al, in U.S. Pat. No. 4,573,316, describe an aft-end ignition system for rocket motors consisting of a lightweight, frangible plastic igniter located between the end of the propellant grain and the inlet of the nozzle. The igniter consists of a plastic tube, an ignition charge, a squib, a foam igniter seal and foam charge cushions. A number of equally spaced petal shaped segments extend at an angle to the central axis of the tube which hold the igniter in place in the nozzle throat and are sized such that the igniter is pushed out of the nozzle throat during burning. Around the squib is a polyurethane foam cushion which seals the space around the squib so as to prevent movement of the ignition charge. A plug of polyurethane foam is bonded at the end of the tube to retain the pellets in the tube during handling of the igniter and the rocket motor. The squib is ignited by an electrical charge. In addition, Carrier, et al, supra, describe use of an O-ring for improving the seal and positioning of the igniter.

Pelham et al, in U.S. Pat. No. 3,974,772, describe a nozzle closure igniter essentially composed of plastic (e.g., polyurethane) which is used in the aft portion of a rocket motor. The igniter comprises a tapered combustible plastic casing having a stepped recess therein comprising a large and small cavity. A squib including a primer charge is positioned in the small cavity. A body of pyrotechnic material is positioned in the large cavity and is held in place by a closure disc.

These igniters have a number of drawbacks, including the need for mechanical bonding or adhesive means for securing the igniter to the rocket motor and forming an aft closure. In addition, they require use of molds and other complex tooling for fabrication, and in one case require a closure disc.

The inventors have developed an aft mounted igniter, which is formed by causing a foam to set up in the nozzle, blast tube and/or exit cone cavity and around an ignition package, which igniter does not have the aforementioned disadvantages and which can be easily installed during rocket motor assembly.

SUMMARY OF THE INVENTION

This invention is directed to a process of forming an igniter in a aft-end assembly for a solid rocket motor, the assembly having an internal cavity and comprising at least one element selected from the group consisting of a nozzle, a blast tube and an exit cone, which process comprises positioning an ignition package comprising pyrotechnic material and an initiator in the assembly cavity and causing a polymer foam to expand and cure in the assembly cavity and around the ignition package, so as to embed and secure the ignition package, form an aft closure, and form the igniter as an integral portion of the assembly.

In addition, this invention is directed to an aft-end assembly for a solid rocket motor which comprises at least one element selected from the group consisting of a nozzle, a blast tube and an exit cone, the assembly having disposed therein polymer foam surrounding an ignition package comprising pyrotechnic material and an initiator so as to embed and secure the ignition package, provide an aft closure, and form an integral portion of the assembly. The foam is capable of filling an assembly having an internal cavity shaped such that a preformed, form-fitting igniter cannot be pushed into the assembly.

DETAILED DESCRIPTION OF THE INVENTION

Figure 1:
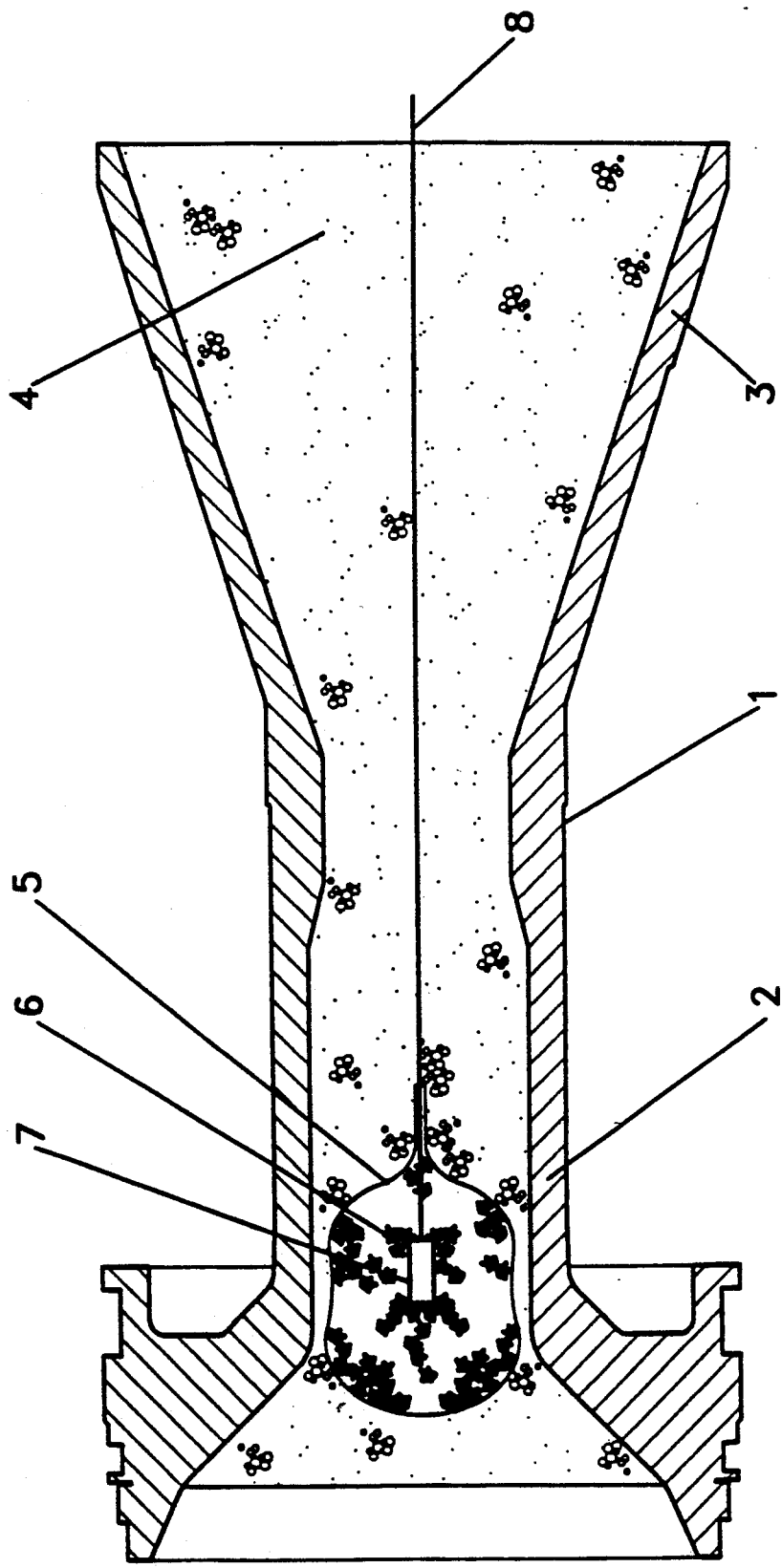
FIGURE 1 shows a side view of an assembly containing a foamed-in-place igniter.

By "igniter" reference is made to the foam and foam-embedded ignition package.

The ignition package comprises any conventional pyrotechnic material useful for igniting rocket motors, provided that the material is capable of providing sufficient heat and/or pressure to ignite the rocket motor and will not ignite during expansion and cure of the foam. Exemplary are fuel-oxidizer mixtures, such as those based upon zirconium, magnesium, boron or aluminum, including $BKNO_3$, $ZrBNiKClO_4$, magnesium-Teflon, etc., and propellants such as smokeless powder and black powder.

Preferably the pyrotechnic material is relatively insensitive to electrostatic or electromagnetic energy, as are $BKNO_3$ pellets. Use of relatively insensitive pyrotechnic material allows installation of the igniter during rocket motor assembly.

The ignition package further comprises means for holding the pyrotechnic material in place, such as shrinkable tubing or a shrinkable bag. The shrinkable tubing or bag holds the granules in place, allowing the igniter to survive vibration without a change in granule size. Preferred are polyethylene bags which can be readily filled with the pyrotechnic material and shrunk using low levels of heat (e.g. $200\pm10°$ F.), such as HBX shrinkable tubing (ICO-Rally Incorporated, Palo Alto, Calif.).

The initiator may be an electro-explosive initiator (squib) which is attached to electrical leads or a laser fired initiator (typically a canister containing granular pyrotechnics, such as $BKNO_3$) which is attached to a fiber optic cable (for laser ignition). Preferred are fiber optic cables since they do not require use of a safe-arm device before motor installation and, therefore, can be installed in the motor during assembly and shipped in place. Moreover, laser safe and arm devices can be mounted on carriers, making them reusable. Initiators useful for this purpose are well known in the art. Laser safe and arm devices are also well known in the art. The igniter of this invention is especially useful with the piezoelectric crystal-powered laser igniter described by Rice in U.S. patent application Ser. No. 362,125 (filed Jun. 6, 1989) (allowed).

Any foam which will expand and cure in place, and which will enable the motor to build adequate ignition pressure and, then, blow out and/or burn (char may form on the walls) may be used in this invention. The foam should provide a burst pressure which forces igniter gases throughout the motor for reliable ignition. The pressure may be varied as desired by choice of foam density and thickness. An ignition spike will not result using the foam igniter of this invention when the foam is selected so that it will blow out at a pressure below that at which the motor operates. The preferred foams are based upon polyurethane or polystyrene with polyurethane foams based upon polyisocyanates, such as Coro-Foam rigid polyurethane foam (Cook Paint and Varnish Company, Kansas City, Mo.), being most preferred.

A major advantage of the invention is that the igniter may be installed during assembly of the motor. The foams may be hand poured or machine applied. According to one process, a plate may be put in place over the bottom portion of the motor, the bag containing the pellets suspended from electrical leads or fiber optic cable, and the premixed form forming components (foaming components are often sold as two part systems which when mixed rapidly form a foam) are poured into place and allowed to cure. The foam forms, expanding rapidly. As the foam develops, the ignition package is embedded in the foam and the igniter becomes an integral part of the assembly.

By "embedded" it is meant that the ignition package is fully embedded (i.e., encapsulated) by the foam or is partially embedded so that the ignition package is partially exposed on the forward end of the assembly (i.e., the side facing the propellant to be ignited).

The foam, with the embedded igniter, cures in place and does not require molds and other complex tooling for fabrication. The foam is resilient and will adhere to the assembly to form an integral portion of the assembly, so that the igniter of this invention also may act as a weatherseal and burst disc. It may be used with all solid rocket motors, from smaller tactical missiles to larger strategic boosters. It may be adapted to motors of most shapes, as the foam conforms to the inside contour of the assembly and is compatible with conventional materials used in manufacturing rocket motors. Typical materials used blast tubes, exit cones and nozzles are carbon-phenolic, silica-phenolic, glass-phenolic, carbon-carbon, and reinforced rubber (including those with graphite reinforcement), as well as steel and other metals. The foam adheres to the assembly, and does not require adhesives or mechanical bonding for sealing (although each may be used, if desired). Often, the assembly has an outer metal shell lined with one of the organic materials. Igniters per this invention are useful over wide temperature ranges and are well sealed. One model has been temperature cycled between −95° F. and 145° F., and successfully leak checked at 50 psig.

The igniters of this invention are useful for igniting all types of propellants, including nitrocellulose-based (such as double base), min-smoke, high aluminized, composite, etc. Test motors containing 12 to 120 pounds of composite or double base propellant have been successfully ignited using 3 to 65 grams of ⅛ inch diameter ×3/16 inch long $BKNO_3$ pellets. The specific size and weight of pyrotechnic material required is based on the pyrotechnic material used, the rocket motor size and the propellant used.

The ejecta of the igniter consists of small pieces of lightweight foam particles that usually fall out of the plume at about 10 to 30 feet. Most of the foam is consumed by burning.

FIG. 1 is the side view of an assembly comprising a nozzle (1), blast tube (2) and exit cone (3) for a missile motor. Polyurethane foam (4) is disposed throughout the assembly and embedded therein is a polyethylene shrinkable bag or tube (5) containing $BKNO_3$ pellets (6) and laser fired initiator (7) (canister containing granular ($BKNO_3$). Laser fired initiator (7) is attached to a fiber optic cable (8), which may be connected to a laser (not shown).

While the invention has been described with respect to specific embodiments, it should be understood that they are not intended to be limiting and that many variations and modifications are possible without departing from the scope and spirit of this invention.

We claim:

1. A process of forming an igniter in an aft-end assembly for a solid rocket motor, the assembly having an internal cavity and comprising at least one element selected from the group consisting of a nozzle, a blast tube and an exit cone, which process comprises positioning an ignition package which comprises a shrinkable bag or tube encasing pyrotechnic material, and an initiator in the assembly cavity and causing a polymer foam to expand and cure in the assembly cavity and around the ignition package, so as to embed and secure the ignition package, form an aft closure, and form the igniter as an integral portion of the assembly, the shrinkable bag or tube having been shrunk prior to being imbedded by the foam.

2. The process of claim 1 wherein the foam is polyurethane foam.

3. The process of claim 1 wherein the pyrotechnic material is selected from the group consisting of fuel-oxidizers mixtures and propellants.

4. The process of claim 1 wherein the pyrotechnic material is selected from the group consisting of fuel-oxidizer mixtures based upon zirconium, aluminum, boron or magnesium, smokeless powder and black powder.

5. The process of claim 1 wherein the foam is selected from the group consisting of polyurethane and polystyrene foams.

6. The process of claim 5 wherein the pyrotechnic material is selected from the group consisting of fuel-oxidizers mixtures based upon zirconium, aluminum, boron or magnesium and propellants.

7. The process of claim 5 wherein the pyrotechnic material is $BKNO_3$ pellets.

8. The process of claim 5 wherein the initiator is a laser fired initiator and is attached to a fiber optic cable.

9. The process of claim 5 wherein the initiator is an electro-explosive initiator attached to electrical leads.

10. The process of claim 5 wherein the ignition package is encapsulated by the foam.

* * * * *